Dec. 26, 1950     J. R. RICHARDSON     2,535,320

TOOL JOINT

Filed April 7, 1944

Julius Ray Richardson
INVENTOR.

BY
Wayland D. Keith
AGENT

Patented Dec. 26, 1950

2,535,320

UNITED STATES PATENT OFFICE 2,535,320

TOOL JOINT

Julius Ray Richardson, Wichita Falls, Tex., assignor to Chicago Pneumatic Tool Company, New York, N. Y., a corporation of New Jersey Application April 7, 1944, Serial No. 529,971

7 Claims. (Cl. 285—146)

This invention relates to an improvement in tool joints and to the method of applying the tool joint to bars, pipes, and the like, such as drill pipe used in well drilling.

It has been the practice heretofore to connect the tool joint with drill pipe through threaded connections, which have presented difficulties in securing tight joints at these threaded connections while also preventing breakage of the pipe at the joint. Welding has been used to some extent for connecting the drill pipe with the tool joint, but this results in stress at the point of the weld which often results in breakage of the drill pipe as a result of the vibrations thereof in use due to the crystallization of the metal.

It has also been proposed to connect the drill pipe with the tool joint by a shrink grip adjacent the threaded connections therebetween, which shrink grip is the result of first heating the joint prior to the screwing connections and then allowing this sleeve to shrink onto the circumference of the drill pipe. Due to the fact that these parts fit relatively close together, the heating of this sleeve portion causes the end of the pipe to be heated and the parts to be secured together while hot, whereby a longitudinal expansion takes place in the threaded portion as well as a circumferential expansion. Since the threads of the tool joint must have sufficient looseness to admit of screwing on while hot, this results in looseness of threaded connection when the joint cools. It has also been the usual practice to provide a shoulder in the tool joint against which the end of the drill pipe abuts when it is screwed up to the desired extent, which is objectionable and unnecessary.

The object of this invention is to improve the manner of applying the tool joints to the drill pipe to insure a tight fit therebetween without danger of breakage at the point of connection, and without requiring special shop equipment to install the tool joint on the drill pipe.

This object is accomplished by providing an enlarged skirt portion on the tool joint that telescopes over the end of the drill pipe adjacent the threaded connection therebetween and is of materially larger diameter than the external diameter of the drill pipe so that it may be heated for expansion without having the heat conducted therefrom directly to the drill pipe. This skirt portion may be heated however for expansion to admit a sleeve therebetween which is then shrunk upon the periphery of the drill pipe as a result of cooling of the skirt portion, thus providing an extended shrink connection between the tool joint and the drill pipe beyond the threaded connection, that insures of a tight fit therebetween without danger of breakage as a result of use of the drill pipe.

The invention is shown in a preferred embodiment in the accompanying drawings in which.

Figure 1:
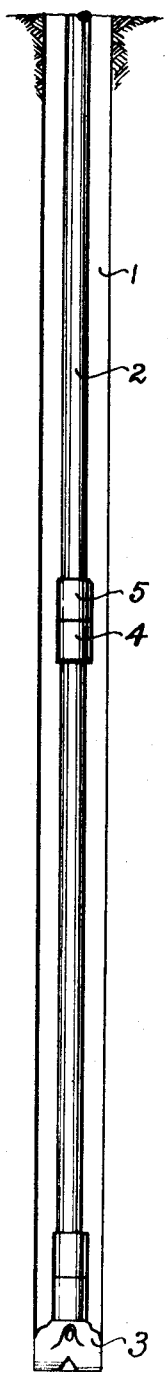
Fig. 1 is a vertical sectional view through a deep well showing in side elevation a string of drill pipe therein.

The invention is shown as adapted for use primarily with a string of pipe employed in well drilling apparatus, and is shown in Fig. 1 in a well 1 of the conventional bored type. The drill pipe 2 is suspended in the well and carries the usual drill bit 3 on the lower end thereof. The drill pipe is normally formed in sections connected together through a tool joint that enables the sections to be secured together at the surface of the ground and lowered into the well.

As shown, the tool joint usually comprises interconnected sections, designated 4 and 5, adapted to be detachably connected together through threaded portions 6, 7 at the inner ends of these sections, so as to form a tight but detachable connection between the joints of pipe, as indicated in Fig. 1.

Figure 2:
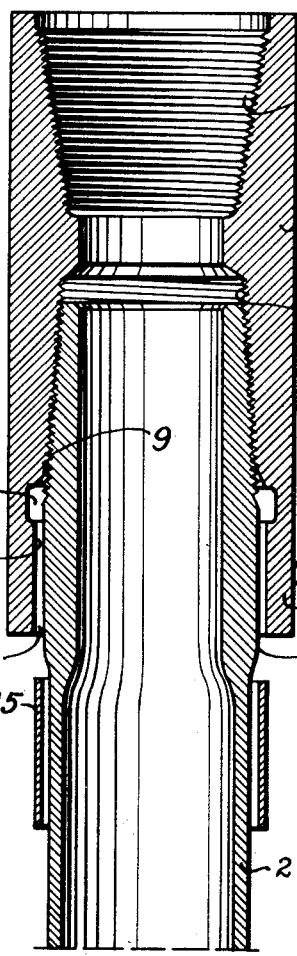
Fig. 2 is a detail longitudinal section of a portion of a tool joint and connected portion of drill pipe before final assembly.
Figure 3:
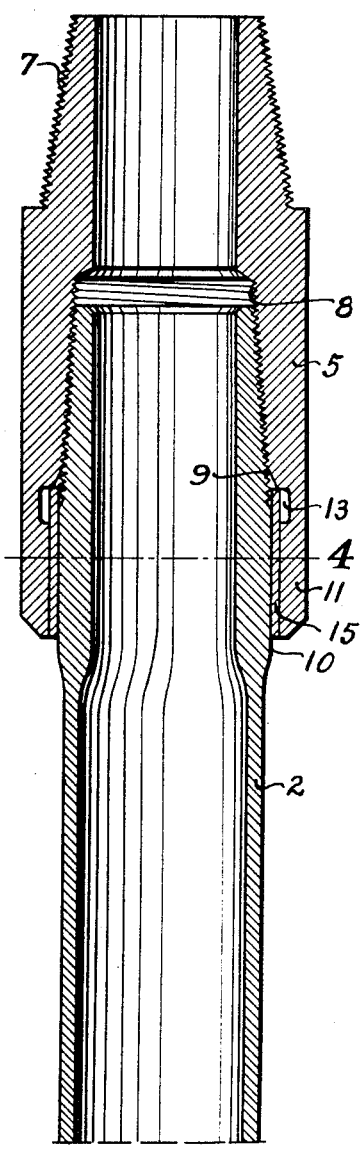
Fig. 3 is a similar view, after assembly, of the companion portion of the tool joint and its connected drill pipe.
Figure 4:
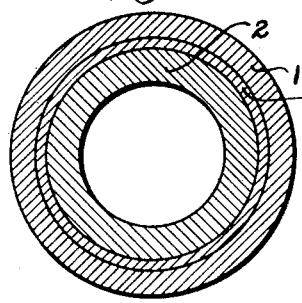
Fig. 4 is a cross section therethrough on the line 4—4 of Fig. 3.

Each tool joint section is adapted to be secured rigidly on the adjacent end of the drill pipe section, for which purpose it has an internally threaded socket 8 in its outer end portion, adapted to interfit with an externally threaded end portion 9 formed on the adjacent drill pipe section 2. The threaded connection 8—9 is so formed usually as to wedgingly engage the pipe joint section with the drill pipe. The threaded socket 8 is so constructed that it will engage tightly and securely the threaded portion 9 of the drill pipe without any engagement by a shoulder or abutment against the end of the drill pipe, as shown in Figs. 2 and 3, which insures the screwing up of the connection tightly on the pipe without anything that might otherwise interfere with a tight engagement.

The drill pipe 2 is provided usually with an enlargement formed by a thickened wall portion thereof, as shown at 10, extending outwardly beyond the threaded end portion 9 thereof a sufficient distance to extend beyond the outer end of the tool joint section interconnected therewith. Extending outwardly from the socket portion 8 of the tool joint section is a surrounding skirt portion 11 that encloses the enlarged portion 10 of the pipe section. This skirt portion 11 has an inner wall 12 permanently spaced outward from the periphery of the enlarged portion 10 of the pipe section, being preferably about one-eighth inch larger in internal diameter than the external diameter of the pipe at the same point. An annular recess 13 is formed preferably between the skirt portion 11 and the socket 8 to provide a relatively thin-wall therebetween which will allow the skirt 11 to expand more readily when heated.

The separation of the wall 12 of the skirt from the periphery of the pipe section at the same point provides a chamber, designated 14, therebetween which is adapted to be filled by a shrink sleeve 15. This sleeve 15 has an internal diameter substantially equal to the external diameter of the enlarged portion 10 of the pipe section, but its external diameter is slightly greater than the internal diameter of the wall 12 at normal atmospheric temperature. I prefer to form the sleeve 15 with an external diameter about .012" larger than the internal diameter of the wall 12. Thus the sleeve 15 will provide for a tight shrinking fit between the skirt 11 and the enclosed periphery of the pipe.

In connecting the pipe end of tool joint with the pipe sections, the sleeve 15 should be slipped over the adjacent end of the pipe section. The sleeve may be heated slightly for this purpose, if desired, although this will not be required usually when the sleeve is made so as to have a sliding fit with the periphery of the pipe enlargement 10. The sleeve would be pushed upward on the pipe section until it clears the enlargement 10 substantially as indicated in Fig. 2. Then the pipe end of the tool joint is screwed onto the threaded end of the drill pipe at 8—9, and drawn up as tightly thereon as possible with a wrench. This leaves the parts substantially in the relation shown in Fig. 2.

Thereafter, the skirt 11 should be heated quickly at localized points throughout the circumference thereof, as for instance, by applying an acetylene or gas torch thereto, as indicated at 16, to cause a circumferential expansion of the skirt 11. Because of the separation of the skirt from the periphery of the drill pipe by the chamber 14, the heat thus applied to the skirt will not be transmitted to any appreciable extent to the drill pipe itself. A sheet of asbestos or other heat insulating material may be inserted into this chamber 14, if additional insulation be desired therein. Therefore, the skirt 11 will expand more rapidly and readily relative to the drill pipe without any appreciable expansion of the latter. This will permit the insertion of the sleeve 15 into the chamber 14, to the position indicated in Fig. 3. Then the pipe is allowed to cool either by atmospheric air or external cooling applied thereto. Since the inner diameter of the wall 12 is less than the external diameter of the sleeve 15, the skirt 11 will shrink the sleeve in binding engagement with the drill pipe 2 as it cools, thereby obtaining a secure tight engagement of the skirt portion of the tool joint section in a shrunk-fit on the periphery of the drill pipe at a point spaced outwardly from the threaded connection therebetween.

This connection may be applied readily in the field by the use of the conventional wrenches and a suitable heating means, such as an acetylene torch or gas torch. It presents the advantages of a cold-screwed joint and a shrink fit which has not been possible heretofore. The tool joint applied in this manner, will insure added strength against the flexing of the drill pipe at the threaded portion, and prevents likelihood of breaking at the point of connection when not protected by the enclosed skirt portion. At the same time it insures the maintenance of a tight fit in the threaded connection without danger of this being loosened as the skirt is shrunk onto the periphery of the drill pipe.

While the invention is directed primarily to its use with drill pipe, it will apply equally well to connections made with other types of pipe or for attaching a collar or connecting member with other pipes or bars in a similar manner, as will be obvious.

I claim:

1. In a drill pipe connection, a tool joint and a drill pipe, said tool joint having an internally threaded socket with a surrounding skirt extending outwardly from said socket, said drill pipe extending through the skirt into the socket and having threaded connection in the socket with the tool joint, said skirt having an internal diameter appreciably greater than the external diameter of the drill pipe within the skirt, and a sleeve fitting between the skirt and drill pipe and closely fitting the drill pipe and having an external diameter greater than the internal diameter of the skirt, whereby the sleeve may be assembled between the skirt and the pipe when said skirt is expanded by heat and is held therebetween by a shrunk fit upon cooling of the skirt.

2. In a drill pipe connection, a tool joint and a drill pipe, said tool joint having an internally threaded socket with a surrounding skirt extending outwardly from said socket, said drill pipe extending through the skirt into the socket and having threaded connection in the socket with the tool joint, said skirt having an internal diameter appreciably greater than the external diameter of the drill pipe within the skirt, and a sleeve fitting between the skirt and drill pipe and closely fitting the drill pipe and having an external diameter greater than the internal diameter of the skirt, whereby the sleeve may be assembled between the skirt and the pipe when said skirt is expanded by heat and is held therebetween by a shrunk fit upon cooling of the skirt, said tool joint having an internal groove therein between the skirt and the threaded socket providing a weakened wall portion for expansion of the skirt upon application of heat thereto.

3. In a pipe connection, a joint and a pipe, said joint having a socket with a surrounding skirt extending outwardly from said socket, said pipe extending through the skirt into the socket and having means of connection in the socket with the joint, said skirt having an internal diameter appreciably greater than the socket and appreciably greater than the external diameter of the pipe within the skirt, and a sleeve fitting between the skirt and pipe and closely fitting the pipe and having an external diameter greater than the internal diameter of the skirt whereby the sleeve may be assembled between the skirt and the pipe when said skirt is expanded by heat and is held therebetween by a shrunk fit upon cooling of the skirt.

4. A method of applying a coupling to a pipe having a threaded end, said coupling having an internally threaded socket therein with a skirt extending outwardly from said socket and having an internal diameter greater than the external diameter of the adjacent portion of the pipe, said method comprising inserting the pipe through the skirt into the socket and screwing the pipe into permanent tight relation therewith, applying a source of heat to the skirt while said skirt is spaced outwardly from the periphery of the pipe and is separated therefrom without heat conducting metal contact therewith causing an outward expansion of the skirt relative to the pipe, inserting a sleeve into the space between the expanded skirt and the periphery of the pipe while the skirt is in expanded condition, and cooling the skirt causing shrinking thereof on the sleeve and shrinking the sleeve onto the periphery of the pipe.

5. A method of applying a threaded coupling to a pipe having a threaded end, said coupling having an internally threaded socket therein with a skirt extending outwardly from said socket and having an internal diameter greater than the external diameter of the adjacent portion of the pipe, and adapted to receive therebetween a surrounding sleeve, said method comprising inserting the pipe through the skirt into the socket and screwing the pipe into the socket substantially in permanent tight relation therewith, applying a source of heat to the skirt while said skirt is spaced outwardly from the periphery of the pipe, and while the sleeve is out of the space between the skirt and pipe, said heat causing an outward expansion of the skirt relative to the pipe, thereafter inserting the sleeve into the space between the expanded skirt and the periphery of the pipe, and cooling the skirt causing shrinking thereof on the sleeve and shrinking the sleeve onto the periphery of the pipe.

6. A method of applying a threaded coupling to a pipe having a threaded end, said coupling having an internally threaded socket therein with a skirt extending outwardly from said socket and having an internal diameter greater than the external diameter of the pipe, said method comprising inserting a sleeve over the threaded end of the pipe, inserting the pipe through the skirt into the socket and screwing the pipe into the socket in permanent tight relation, applying a source of heat to the skirt while said skirt is spaced outwardly from the periphery of the pipe and while the sleeve is beyond the skirt, said heat causing an outward expansion of the skirt relative to the pipe, inserting the sleeve into the space between the expanded skirt and the periphery of the pipe, and cooling the skirt causing shrinking thereof on the sleeve and shrinking the sleeve onto the periphery of the pipe.

7. A method of assembling a hollow tool joint having a counterbore in one end and an internal pipe thread within the inner end of said counterbore, with a drill pipe having a substantially uniform external diameter and an external pipe thread on the end thereof, and with a sealing and locking ring, the diameter of the counterbore being uniform and slightly less than the external diameter of the sealing and locking ring while the internal diameter of said ring is uniform and arranged to make a close fit on the uniform external diameter of the drill pipe which method consists in screwing the pipe into the tool joint with the external thread of said pipe engaging with the internal thread of said tool joint up to a predetermined degree of torque, heating the counterbored portion of the tool joint to expand said portion, introducing the ring into the counterbore while mounted on the drill pipe, and allowing the assembled tool joint and drill pipe to cool in order to shrink fit said counterbored portion of said tool joint upon the sealing and locking ring and clamp the latter upon said drill pipe.

JULIUS RAY RICHARDSON.

REFERENCES CITED

The following references are of record in the file of this patent:

UNITED STATES PATENTS

| Number | Name | Date |
| --- | --- | --- |
| 129,691 | Tasker | July 23, 1872 |
| 347,060 | Rankin | Aug. 10, 1886 |
| 414,686 | Dinn | Nov. 12, 1889 |
| 1,265,706 | Bardeen | May 7, 1918 |
| 1,332,888 | Corson | Mar. 9, 1920 |
| 1,594,579 | Timbs et al. | Aug. 3, 1926 |
| 1,857,912 | Jones | May 10, 1932 |
| 2,054,118 | Childs et al. | Sept. 15, 1936 |
| 2,181,343 | Reimschissel | Nov. 28, 1939 |
| 2,294,289 | Frauenthal | Aug. 25, 1942 |
| 2,315,357 | Smith | Mar. 30, 1943 |